United States Patent
Van Gassel et al.

(10) Patent No.: US 8,151,299 B2
(45) Date of Patent: Apr. 3, 2012

(54) METHOD AND RECEIVING UNIT FOR FAST CHANGE OF SERVICES

(75) Inventors: Jozef Pieter Van Gassel, Eindhoven (NL); Gang Wang, Shanghai (CN); Fangzhong Shen, Shanghai (CN); Gilein De Nijs, Eindhoven (NL); Steven Broeils Luitjens, Eindhoven (NL); Jian Zhang, Shanghai (CN); Jiawen Tu, Shanghai (CN); Hua Jiang, Shanghai (CN)

(73) Assignee: Koninklijke Philips Electronics N.V., Eindhoven (NL)

( * ) Notice: Subject to any disclaimer, the term of this patent is extended or adjusted under 35 U.S.C. 154(b) by 385 days.

(21) Appl. No.: 12/514,130

(22) PCT Filed: Nov. 13, 2007

(86) PCT No.: PCT/IB2007/054602
§ 371 (c)(1),
(2), (4) Date: May 8, 2009

(87) PCT Pub. No.: WO2008/059438
PCT Pub. Date: May 22, 2008

(65) Prior Publication Data
US 2009/0328114 A1  Dec. 31, 2009

(30) Foreign Application Priority Data
Nov. 14, 2006 (EP) .................................. 06123982

(51) Int. Cl.
*G06F 3/00* (2006.01)
(52) U.S. Cl. .................... 725/38; 455/3.04; 375/316

(58) Field of Classification Search .................. None
See application file for complete search history.

(56) References Cited

U.S. PATENT DOCUMENTS

| 6,188,448 | B1 | 2/2001 | Pauley |
| 2004/0111741 | A1 | 6/2004 | DePietro |

(Continued)

FOREIGN PATENT DOCUMENTS

| EP | 1684450 A2 | 7/2006 |
| WO | 2006031925 A2 | 3/2006 |
| WO | 2006061765 A2 | 6/2006 |

OTHER PUBLICATIONS

"Mobile TV: New Wine for New Bottles?"; Satama Insight #1, 2006, 9 Page Company Brochure Downloaded From http://voice.satama.com.

(Continued)

*Primary Examiner* — Kristine Kincaid
*Assistant Examiner* — Robert Hance

(57) ABSTRACT

The present invention relates to a method of changing between a plurality N of distinct services, e.g. television channels, receivable on a receiving unit, such as a mobile phone/cellular phone, a personal digital assistant (PDA), a handheld television unit, or similar devices. The receiving unit is adapted to receive the plurality of services in a time slicing mode with services being arranged in a certain time slice sequence. The receiving unit is capable of receiving a first service (S1). When "zapping" from the first service to a second service, the second service (S4) being chosen is the currently next service in time within the time slice sequence so as to minimize the time (t2) between service changes. Thereby, a fast method of changing between services is provided in a simplified manner, the speed of change reaching the theoretical maximum when using time slicing.

21 Claims, 6 Drawing Sheets

U.S. PATENT DOCUMENTS

| | | | |
|---|---|---|---|
| 2005/0174483 A1* | 8/2005 | Ruckriem | 348/387.1 |
| 2005/0216951 A1 | 9/2005 | MacInnis | |
| 2007/0097272 A1* | 5/2007 | Moradi et al. | 348/731 |
| 2007/0110105 A1* | 5/2007 | Usuki et al. | 370/487 |
| 2007/0142082 A1* | 6/2007 | DaCosta | 455/556.1 |
| 2007/0188665 A1* | 8/2007 | Watson et al. | 348/731 |

OTHER PUBLICATIONS

"Halfbakery: Random Remote Button" www.halfbakery.com, Apr. 29, 2005, Retrieved from the Internet on Nov. 7, 2011: URL: http://www.halfbakery.com/idea/rRandom_20Remote_20Button.

* cited by examiner

US 8,151,299 B2

METHOD AND RECEIVING UNIT FOR FAST CHANGE OF SERVICES

FIELD OF THE INVENTION

The present invention relates to a method for changing between a plurality N of distinct services receivable on a receiving unit. The invention also relates to a corresponding receiving unit, such as a mobile phone/cellular phone, a personal digital assistant (PDA), a handheld television unit, or similar devices.

BACKGROUND OF THE INVENTION

With the rapid growth of the mobile phone market, more and more consumers are using their mobile phones for multimedia applications—not only for communications but also for entertainment and information services. Sophisticated mobile applications are becoming the driving power of the mobile phone market. TV-on-Mobile, i.e., watching TV on mobile phones is expected to be a key mobile application in the near future. DVB-H (Digital Video Broadcasting-Handheld) is one of the enabling technologies for TV-on-Mobile. Compared to DVB-T (Digital Video Broadcasting-Terrestrial), DVB-H reduces the power consumption and improves mobility. In order to reduce the power consumption, DVB-H adopts a so-called time slicing technology to reduce the power consumption of the terminal. The main idea of time slicing is to use discrete high-speed bursts to carry a service instead of continuous transmission. Therefore the front-end of the terminal only works within a certain burst period and can be powered down until the next burst time arrives. Of course the transmitter of the head-end is working all the time, and it will transmit other signals between two bursts of the same service. At the terminal side, there must be a buffer to store the burst information and regenerate the original bit-rate data streams. For example, usually the burst data rate will be 10 times lower than the constant bit-rate, so it can save 90% power consumption.

When watching TV on mobile phones, users are very likely to use buttons (e.g. channel +/−) to browse all the available TV programs. However, based on the time-slicing mechanism, there will be a longer time delay compared with the traditional analogue TV (about 2-5 seconds depending on the slice structure) during channel switching. The delay is unacceptable especially for TV-on-mobile users, since they are expected to watch TV for short periods of times during different times of the day (e.g. while commuting). This makes fast channel scanning even more important than on an ordinary TV.

WO 2006/031925 discloses a solution to the above-mentioned problem by a method for providing zapping data for one or more programs transmitted using time slicing. The zapping data may be provided by a zapping data provider or server, or may be created at the mobile terminal based on received program information. With this method the change or zapping time between services may be reduced to an acceptable level for the user i.e. 1 second or less. However, this method has the disadvantage that zapping data has to be generated at the transmitting side. At the receiving side zapping data has to be received and/or processed, which requires power used from the limited battery. At the transmitting side the zapping data cannot be tailored to the specific user preferences without straining the available transmission capability unnecessarily and thereby lowering the frequency spectrum efficiency. Thus, the solution complicates the transmission of services and does not provide the user with the familiar zapping experience between services in for example a traditional analogue TV as zapping data is typically a static picture.

Hence, an improved method for changing between services would be advantageous, and in particular a more efficient and/or reliable method would be advantageous.

SUMMARY OF THE INVENTION

Accordingly, the invention preferably seeks to mitigate, alleviate or eliminate one or more of the above-mentioned disadvantages singly or in any combination. In particular, it may be seen as an object of the present invention to provide an improved method for changing between services that solves the above-mentioned problems of the prior art with delays in connection with service changes.

This object and several other objects are obtained in a first aspect of the invention by providing a method for changing between a plurality N of distinct services receivable on a receiving unit, the receiving unit being adapted for receiving the plurality of services in a time slicing mode with services being arranged in a first time slice sequence, the method comprising:
receiving a first service, and
changing from receiving a first service to receiving a second service,
wherein said second service is chosen as the earliest playable service of the following services in time within the first time slice sequence, or a second time slice sequence, so as to minimize the time between service changes.

The invention is particularly, but not exclusively, advantageous for obtaining a fast method of changing between services in a simplified manner, the speed of change reaching the theoretical maximum when using time slicing. Accordingly, the present invention is relatively easy to implement by modification of existing receiving units available. The present invention does not necessitate modification in the way services are transmitted to a plurality of receiving units, which therefore also may facilitate easy implementation into practical operation because problems with (backward) compatibility of different receiving units do not arise.

In the context of the present invention, it is to be understood that by "receiving a service" is meant the process of:
1. a wireless signal portion being received by the receiving unit, the signal portion being representative of a service,
2. processing the signal portion, and
3. making the signal portion corresponding to the service accessible to a user of the receiving unit. The service may be a television signal, a video signal, an audio signal, or a radio signal, but the invention is not limited to these examples of services. Similarly, the user can access the wide ranges of services in correspondingly different ways, e.g. watching and/or listening.

The receiving unit may receive more than one service during one time slice period (T). Thus, within a time slice period the unit can in a first half of the time slice period receive one service and in the other half of the time slice period receive another service.

Advantageously, the receiving unit may store information in a service change memory (Q) regarding services that have been received previously in a service change cycle in order to keep track of services already accessed. A service change cycle may be understood to be a sequence of services being received within a relatively short time domain. Thereby, the second service may be chosen as the earliest playable service of the following services in time within the first or the second time slice sequence that has not previously been received in the service change cycle stored in the service change memory (Q) so as to avoid e.g. double watching of a specific television service. The service change memory (Q) may additionally keep track of services being recently received from different transport streams as explained in more detail below.

Each service stored in the service change memory (Q) may additionally or alternatively be allotted an expiration time (t_ex), and upon expiration of said expiration time (t_ex) the corresponding service is discarded from the service change memory (Q). The expiration time (t_ex) may be set by the user (actively or passively by the receiving unit) or during manufacturing of the receiving unit.

Alternatively or additionally, only the latest received K services in the service change memory (Q) may be considered received in the service change memory (Q), K being smaller than N. This will in effect provide a truncated memory.

Beneficially, the second service may be chosen under the condition that the currently next service in time within the first or the second time slice sequence has a random access signal portion, said random access signal portion being decodable without a previous and/or a subsequent signal portion of the second service. Thus, for video or television signals the second service may be chosen as the next service in time comprising an intra-picture (I-frame) in order to be able to directly access the next service.

In one embodiment, the changing from a first service to a second service may be performed automatically in a predetermined manner. Thus, automatic zapping—initiated by a user—can be performed by the receiving unit. The automatic change may beneficially be synchronized with the time slicing sequence of services by matching the period of automatic change with the time slice period (T) times a fixed number, the fixed number being set to lower double accessing of services during automatic changes.

In another embodiment, the receiving unit may be adapted for receiving and storing an additional third service simultaneously with receiving said first service in a time slice mode.

By storing in parallel an additional third service, fast zapping or change to this service is facilitated. The third service which may be a preferred service by the user i.e. the third service may be chosen from a list of user preferred services, the list may be actively selected by the user or alternatively the list may be generated based on previous user history, in the latter case the user is thereby passively selecting or generating the list.

In a second aspect, the invention relates to a computer program product being adapted to enable a computer system comprising at least one computer having data storage means associated therewith to control a receiving unit according to the first aspect of the invention.

This aspect of the invention is particularly, but not exclusively, advantageous in that the present invention may be implemented by a computer program product enabling a computer system to perform the operations of the first aspect of the invention. Thus, it is contemplated that some known receiving unit may be changed to operate according to the present invention by installing a computer program product on a computer system controlling the said receiving unit. Such a computer program product may be provided on any kind of computer readable medium, e.g. magnetically or optically based medium, or through a computer based network, e.g. the Internet.

In a third aspect, the invention relates to a receiving unit being adapted for receiving a plurality N of services in a time slicing mode with services being arranged in a first time slice sequence, the unit comprising:
  receiving means for receiving a service, and
  access means for making the received service accessible to a user, wherein the receiving unit is arranged for changing from receiving a first service to receiving a second service, said second service being chosen as the earliest playable service of the following services in time within the first time slice sequence, or a second time slice sequence, so as to minimize the time between service changes.

The first, second and third aspects of the present invention may each be combined with any of the other aspects. These and other aspects of the invention will be apparent from and elucidated with reference to the embodiments described hereinafter.

BRIEF DESCRIPTION OF THE FIGURES

The present invention will now be explained, by way of example only, with reference to the accompanying Figures, where.

DETAILED DESCRIPTION OF AN EMBODIMENT

Figure 1:
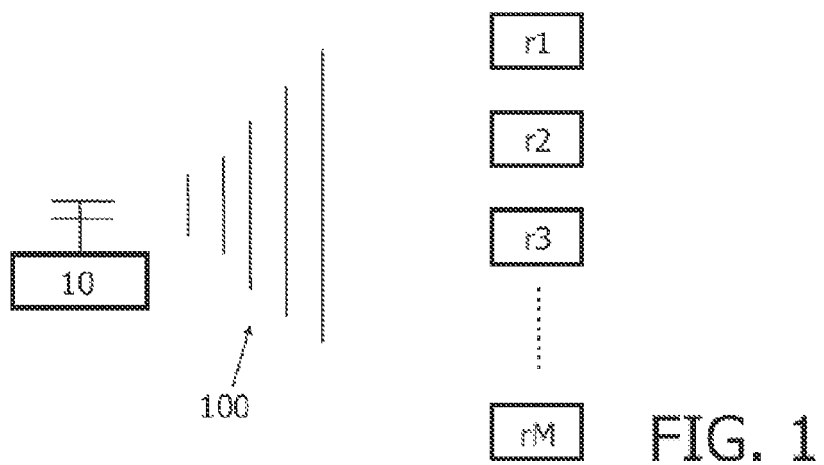
FIG. 1 is a schematic drawing of a transmitter emitting a signal and a plurality of receiving units.

FIG. 1 is a schematic drawing of a transmitter 10 emitting a wireless signal 100 and a plurality M of receiving units r1, r2, r3 up to rM, where M can represent a number of receivers being several hundreds, several thousand or even more. The signal 100 can comprise a plurality N of services within a transport stream by employing the digital video broadcasting—handheld (DVB-H) technology. The DVB-H is adapted as ETSI standard EN 302 304. DVB-H offers a downstream channel at high data rates which can be used as a standalone or as an enhancement of e.g. mobile telecommunication networks. The teaching of the present invention is however not limited to this standard, as it is contemplated that the teaching of the present invention can also beneficially be applied to such standards as the digital media broadcasting (DMB) standard or other technologies where services are broadcasted by time slicing. Other evolving technologies, such as DVB-SSP and STiMi are also expected to use time slicing.

It should be mentioned that the wireless signal 100 could also comprise a plurality of so-called transport streams, each transport stream usually having a distinct frequency of operation, though in the case of hierarchical modulation there may be multiple transport streams at a single frequency. Each transport stream can then comprise a plurality of services broadcasted by time slicing as will be explained in more detail in connection with FIG. 5. In that manner the range of services can be significantly expanded. The various frequencies can for example be used by different services providers.

The services can include, but are not limited to, a television signal, a video signal, an audio signal, or a radio signal. The receiving units r1, r2, r3, up to rM can include, but is not limited to, a mobile phone/cellular phone, a personal digital assistant (PDA), a handheld television unit, or similar devices capable of receiving a plurality of services N arranged in a time slice sequence within a signal 100. The receiving units may be commonly denominated as mobile receiving units or portable receiving units. Alternatively, the receiving units are common in that they are self-powered, i.e. the receiving units are connected to or comprise an independent power source of some kind, for example a battery, a fuel cell etc.

Figure 2:
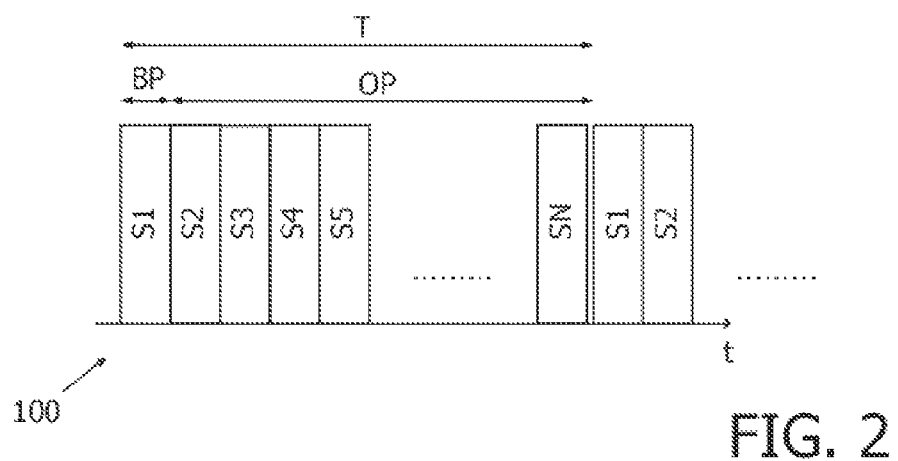
FIG. 2 is a schematic drawing of a time slice signal with a plurality of services.

FIG. 2 is a schematic drawing of a time slice signal 100 with a plurality N of services S1, S2, S3, S4, S5, and so forth up to SN, as a function of time t (indicated on the horizontal scale). In time slicing mode, a single service signal S1 (e.g. television signal) is received discontinuously in time, each signal having a separate time slice in a "burst" cycle of period T. As shown in FIG. 2, service signal S1 is accordingly transmitted during the "burst" period BP (on) and is not transmitted during the off period OP. Thus after the burst cycle period T, the next signal portion of the service signal S1 is broadcasted and similarly for the other services; S2, S3, S4, S5 and so forth up to SN. Burst cycles T can last from a few seconds up to 40 seconds or more depending on the number of services, the burst period BP of the services, and the broadcasting network applied.

Figure 3:
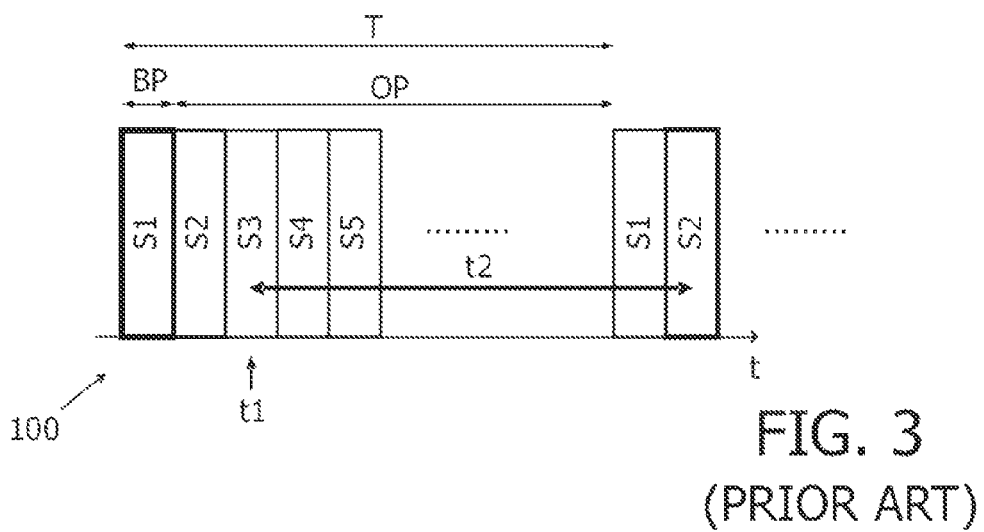
FIG. 3 is a schematic drawing of how a conventional service change is performed.

FIG. 3, which is similar to FIG. 2, is a schematic drawing of how a conventional service change is performed, and FIG. 3 is included for better appreciation of how the present invention works. Assume that a user is receiving and accessing service S1 (indicated by bold borders) by a receiving unit r1, the receiving unit r1 being capable of providing the user with a substantially continuous user experience while accessing S1 (e.g. a television signal). At time t1, the user decides to change service from S1 to the logically next service or data channel in the time slice sequence which is service S2. At this time t1, the time sliced signal 100 is however broadcasting S3, and the user has to wait for a time t2 until service S2 is transmitting again. The waiting period t2 can often be of a comparable length to the burst cycle period T (i.e. order of seconds), and thus causing user discomfort. On average the delay is about half the burst cycle duration (assuming a uniform probability distribution).

It should be mentioned that the plurality N of services can of course be arranged in a receiving unit in a order different from the order of services within the time slice sequence, and accordingly the user will not necessarily change service to the next logical service within the time slice sequence, but to the next logical service in the order arranged in the receiving unit. For example, the user can have a list of arranged channels CH1, CH2, CH3, CH4, CH5, up to CHN, which is not sequentially arranged in the same order as the services in the time slice sequence of the signal 100. Nevertheless, a user will experience a waiting period t2 with the discomfort associated therewith.

Figure 4:
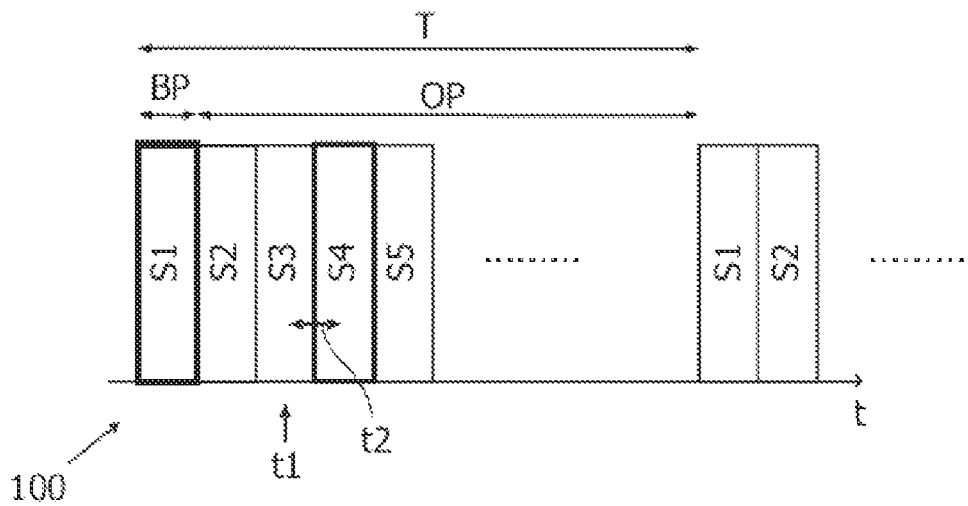
FIG. 4 is a schematic drawing of a service change performed according to the present invention.

FIG. 4, which is similar to FIGS. 2 and 3, is a schematic drawing of a service change according to the present invention, where the receiving unit r1 is receiving a first service S1 (indicated by bold border), and at time t1 the receiving unit is prompted (e.g. by a user) to change from receiving a first service S1 to receiving a second service. The second service is then chosen as the earliest playable service of the following services in time within the first time slice sequence or a second time slice sequence, so as to minimize the time (t2) between service changes.

According to one embodiment of the invention, the earliest playable service is the currently next service in time within the first time slice sequence, or a second time slice sequence, which at the time t1 is the service S4 (indicated again by bold border). By changing to the currently next service S4 in time—and not to the next logical service within the time slice sequence S2 as shown in FIG. 3—it is possible to minimize the waiting time t2 between service changes in an efficient and systematic manner.

Figure 5:
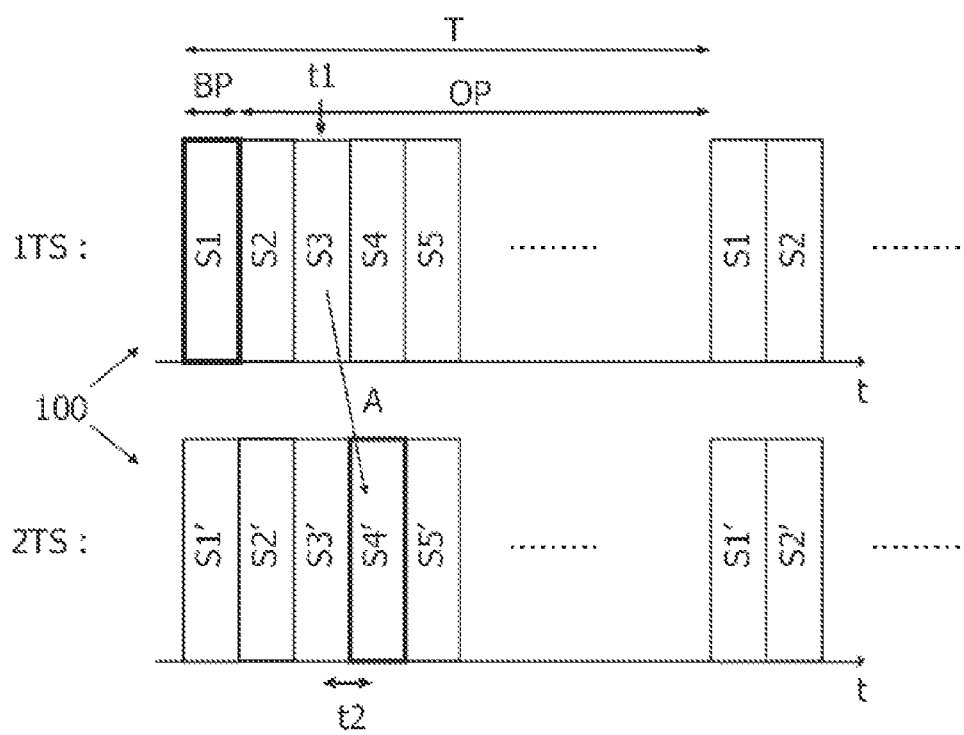
FIG. 5 is another schematic drawing of a service change performed according to the present invention

In FIG. 5, which is similar to FIG. 4, two transport streams 1TS and 2TS are shown. For simplicity, the two streams 1TS and 2TS are schematically indicated as having a similar period T, but this need not be the case for application of the present invention. The second transport stream 2TS comprises a plurality of services S1', S2', S3', S4', S5' and so forth being broadcasted in a time slice mode. As in FIG. 4, the receiving unit r1 is receiving a first service S1 (indicated by bold border), and at time t1 the receiving unit is prompted (e.g. by a user) to change from receiving a first service S1 to receiving a second service. The second service may then be chosen as the currently next service in time within the time slice sequence of the second transport stream 2TS, which at the time t1 is the service S4' (indicated by bold border). Notice that similar to FIG. 4, the delay t2 experienced by a user is the smallest possible. This should be compared to a conventional zapping process, where the next service would be the logically next service within a memory of services in transport streams 1TS and 2TS receivable on the receiving unit. The performed service change may be termed an inter transport stream service change and is indicated by arrow A. The receiving unit r1 should accordingly be retuned so as to receive the second transport stream e.g. tuned to another radio frequency. The delay for retuning is relatively low i.e. in order of milliseconds.

As it will be understood, in some embodiments of the invention the second service S4 or S4' chosen is the currently next service in time that fulfils certain requirements, e.g. that the service has not been accessed recently, or that the burst containing the next service has a random access signal portion, the random access signal portion being decodable without a previous and/or a subsequent signal portion of the second service, for example an intra picture (I-frame), but not an inter picture (P-frame).

It can be mentioned that when changing services according to FIG. 3, it can also by coincidence happen that the next logical service within the time slice sequence (or within a user channel list) is also the next service in time within the time slice sequence. This will however only occur with a theoretical probability which is the reciprocal of the number of services N (assuming for simplicity that the time slices for all the service have equal duration). Thus, with 10 services this will only happen in 10% of the service changes, which is not satisfactory for a user. The present invention which enables fast zapping between services can of course be combined with traditional zapping between services depending on a user preference and/or preset settings e.g. made during the manufacturing.

According to a second embodiment of the invention, if the currently next service do not have a random access signal portion (for example: with a video stream which can only be accessed after receiving an I-frame), the position of the I-frame inside the time slice (burst) of the currently next service needs to be considered.

Usually, after receiving an I-frame, the I-frame and its following frames can be played. But in zapping mode, if the I-frame is received very late in a time slice, the I-frame and its following frames within this time slice can only be played a very short period, and therefore, in order to seamlessly merge with the next time-slice, the playable time for this time slice is determined not only by the receiving time of I-frame, but also by the time-slice cycle. In other word, since the playable time-length of the I-frame and its following frames within one time slice cannot cover the whole time slice cycle until the next time slice arriving, the playing time of the I-frame should be postponed to a video playable time so that the next time slice can be played seamlessly.

The video playable time of I-frame for seamlessly merging with the next time slice can be calculated, by the arriving time of next time slice corresponding to the same service minus the playable time-length of the I-frame and its following frames. In different time slices, the playable time-length of the I-frame and its following frames are different because of different I-frame position, and the time slice cycle between two adjacent time slices corresponding to the same service are also different. In other words, the earliest received time slice which corresponding to the currently next service may not have the earliest playable time. Therefore, the currently next service may not be the earliest playable service.

According to this second embodiment of the invention, a method is thus proposed for determining the earliest video playable service. The method comprises the steps of:
- calculating a set of video playable times of each following service according to video packets contained in said following services, said each following service being arranged to play at said video playable time for playing seamlessly,
- determining said earliest playable service according to said set of video playable times.

Figure 9:
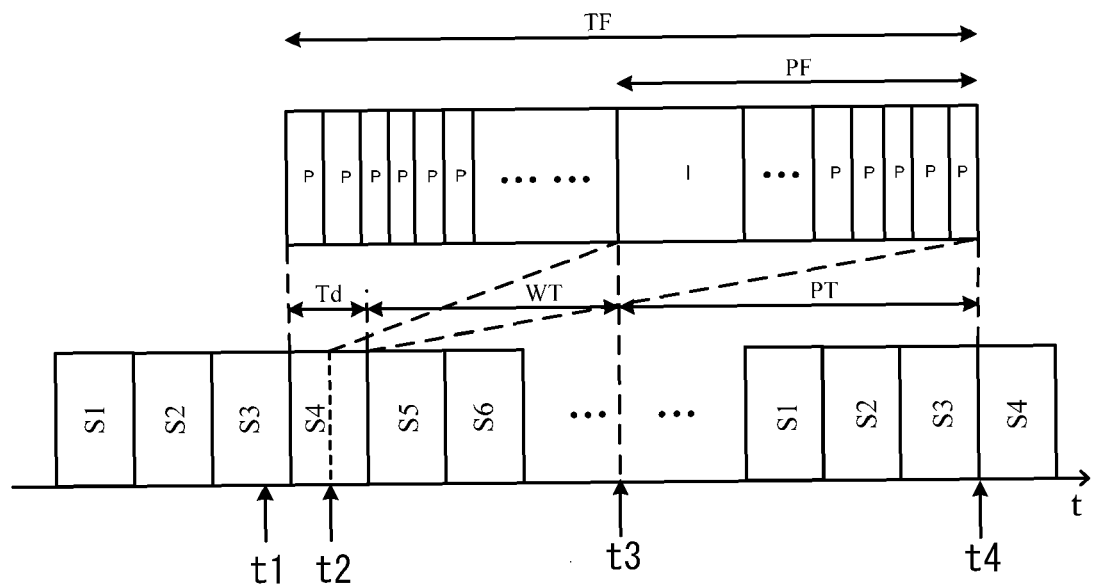
FIG. 9 is a schematic drawing of video packets and video playable time of a service according to the present invention.

FIG. 9 is a schematic drawing of the video playable time of a service in switching (zapping) mode according to the present invention. TF are the total frames of the time slice of S4 (service 4), S4 being the currently next service at switching request time t1. PF are the playable frames since they contain I-frame. However, the frames PF can not be played immediately after being received at time t2, implying to wait for a certain time-length WT after receiving the frames PF in order to seamlessly merge with the next time slice corresponding to S4. In other words, frames PF can be played from time t3 to t4. In FIG. 9, t3 is the video playable time for S4, t4 is the starting time of next time slice of S4. PT is the playable time-length for S4.

In FIG. 9, the waiting time-length WT and playable time-length PT may be calculated formulas as follows:

$$PT = \frac{m}{f} \quad (1)$$

$$WT = \Delta t - \frac{m}{f} - T_d \quad (2)$$

Where
m: the total number of frames after the I-frame (including the I-frame)
f: the frame rate (e.g. how many frames will be rendered per second)
$\Delta t$: time slice cycle period
$T_d$: time slice duration When the waiting time-length WT is calculated, the absolute video playable time $T_{VP}$ can be calculated as follows, according to the absolute time of S4 being received and the waiting time-length WT:

$$T_{VP} = T_{ref} + WT + T_d \quad \text{Or} \quad (3)$$

$$T_{VP} = T_{ref} + \Delta t - \frac{m}{f} \quad (4)$$

Where
$T_{VP}$: Absolute video playable time for a given service
$T_{ref}$: Absolute time of receiving packet of a time slice
The absolute video playable time $T_{vp}$ may also be calculated as below formula:

$$T_{VP} = T_{ref} + (t_1 - t_{ref})/S_v + \Delta T_{margin} \quad (5)$$

Where
$t_1$: RTP timestamp of the I-frame to be played
$t_{ref}$: RTP timestamp of receiving packet of a time slice
$S_v$: Scale of RTP timestamp of a video RTCP packet
$\Delta T_{margin}$: A margin value to provide codec with sufficient processing time RTP stands for Real-Time Transport Protocol, and is an Internet protocol for transmitting real-time data such as audio and video. RTP itself does not guarantee real-time delivery of data, but it does provide mechanisms for the sending and receiving applications to support streaming data. Typically, RTP runs on top of the so-called User Datagram Protocol (UDP). For each audio/video packet, there is an RTP header from which the timestamp of the audio/video packet can be obtained.

RTCP stands for RTP control protocol, it forms part of the RTP protocol used to carry VoIP communications. RTCP monitors the quality of service (QoS) and to convey information about the participants in an on-going session. It is based on the periodic transmission of control packets to all participants in the session, using the same distribution mechanism as the data packets. From the periodical transmitted RTCP packet, the scale of RTP timestamp of a video RTCP packet can be obtained.

Figure 10:
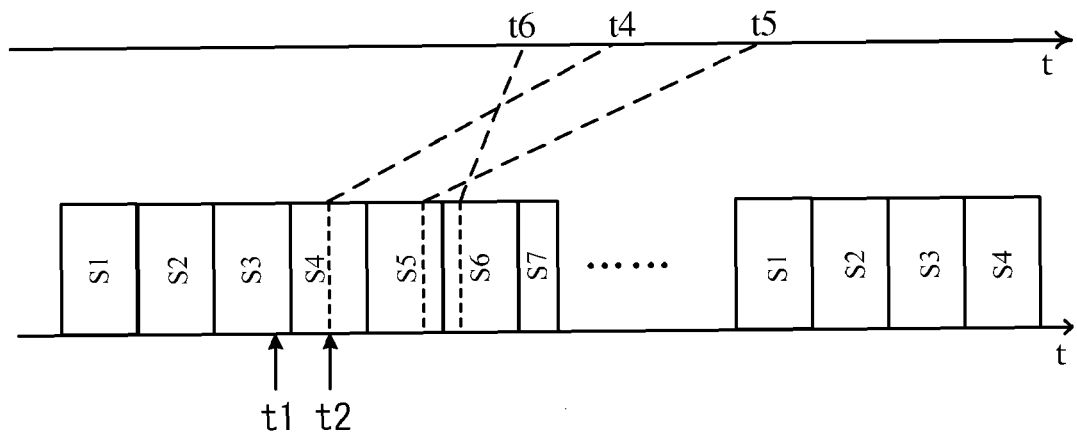
FIG. 10 is a schematic drawing of a set of video playable times of several services according to the present invention.

FIG. 10 is a schematic drawing of video playable times of several services in zapping mode according to the invention. As explained above, in order to seamlessly merge with the next time slice within one service, the video playable time of each service depends on the position of I-frames in each time slice and the time slice cycle.

Similarly, the video playable time can be known for service S5, and service S6. For example, t4 is the video playable time for service S4, t5 is the video playable time for service S5, and t6 is the video playable time for service S6. From FIG. 10, it is apparent that t6 is the earliest video playable time among S4, S5, and S6. Therefore, S6 is chosen as the earliest playable service and to be the switching target service accordingly.

It is to be understood that the playable time of service S7 no longer needs to be calculated since t6 is also earlier than the receiving time of S7.

It is to be understood that the step of calculating will be terminated when one of the calculated playable time is arrived. In FIG. 10, before the playable time of S7 is calculated, time t6 is coming, and therefore, the receiver stops the step of calculating. Then, S6 is rendered as the second service at time t6.

According to a third embodiment of the invention, if the currently next service involves not only video packets but also audio packets, the synchronization of audio and video needs to be considered.

For choosing the earliest playable service, a method is proposed which comprises the steps of:

calculating a set of video playable times of each following service according to each video packet contained in said following services, and calculating a set of audio playable times of each following services according to each audio packets contained in said following services, said each audio packets to be played synchronously with each video packets, said each following service being arranged to play at said video or audio playable time for playing seamlessly, selecting a set of latest playable times from each pair of said video playable time and said audio playable time corresponding to video packets and its related synchronous audio packets, and selecting an earliest playable time from said set of latest playable times, determining said earliest playable service according to said earliest playable time.

As mentioned above, in the zapping mode, in order to play seamlessly, the playable time for video packets within a given time slice can be calculated. However, if there are synchronous audio packets that need to be played together with the video packets, and the playable time of the synchronous audio packets also should be taken into account, because the synchronous audio packets may be received earlier or later than the video packet. As a consequence, the playable time-length of the audio packet within one time slice may be longer or shorter than the playable time-length of the I-frame and its following frames within one time slice.

If the audio playable time-length is longer than the video playable time-length, it is ok to play the I-frame and its following frames from video playable time; but if the audio playable time-length is shorter than video playable time-length, and if the audio packets is played from the video playable time, the audio packets can not last out until the next audio packets in next time-slice arriving. In this case, the audio playable time for audio packets being played seamlessly should be chosen as the playable time of the given service (channel). In other words, considering that audio and video packets should be played synchronously and seamlessly, a latest playable time between video and it synchronous audio packets should be chosen as the playable time of the given service.

As above mentioned, the video and the synchronous audio packets can be identified by the timestamps included in each audio and video RTP header.

Figure 11:
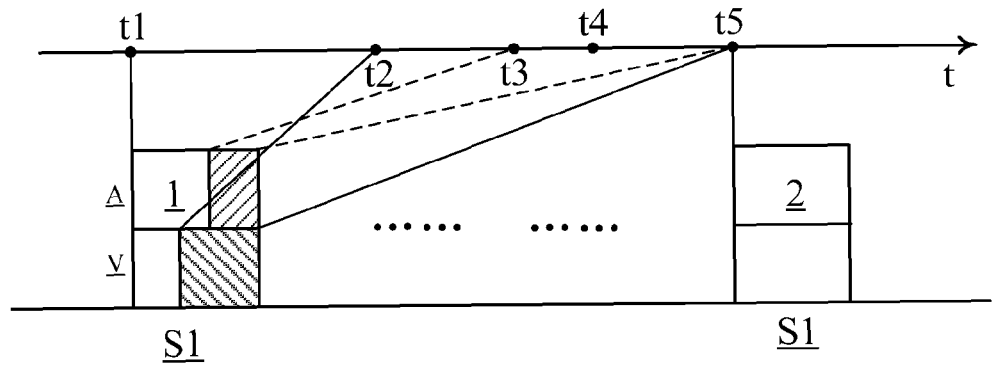
FIG. 11 is a schematic drawing of a video playable time and an audio playable time of a given service according to the present invention.

FIG. 11 illustrates video playable time and audio playable time of a given service in a time axis. According to FIG. 11, t1 is the starting time of receiving the audio/video packets of the first time slice corresponding to S1 (service 1), t2 is the video playable time according to the video packets for seamless playing with the next time-slice, and the duration from t2 to t5 is the video playable time-length. t3 is the audio playable time of the synchronous audio packets for seamlessly merging with the next time-slice, and the duration from t3 to t5 is the playable time-length of synchronous audio packets (the synchronous audio packets is shown by cross-hatched area in audio packets in FIG. 11).

Since the synchronous audio packets should be played synchronously with the video. In other words, if the video packets is played at time t2, the synchronous audio packets also should be played at time t2, as a result, the audio packets can only last to t4, and from t4 to t5, there do not have any audio packets can be displayed. Therefore, at time t2 the audio and video packets cannot be played. But, it is ok if the video packets is arranged to display at time t3 according to audio playable time which is the latest time between the pair of video playable time and audio playable time, because from t3 to t5, both video and audio packets can meet the requirement of seamlessly merge and also it meets the requirement of playing synchronously.

The method of calculating the video playable time is already described above.

The method of calculating the audio playable time will be described below:

$$T_{AP}=T_{ref}+T_d-(t_{end}-t_{1A})/S_A \qquad (6)$$

Where:
$T_{AP}$: Absolute audio playable time
$T_{ref}$: Absolute time of receiving packet of a time-slice
$T_d$: time slice duration
$t_{end}$: RTP timestamp of the last audio packet within a given time slice
$t_{1A}$: RTP timestamp of the audio packets synchronous to the I-frame of video packets
$S_A$: Scale of RTP timestamp of an audio RTCP packets After the video playable time and the audio playable time for the video and its synchronous audio packets are calculated, a latest playable time can be determined for the pair of audio and video packets. In this way, a set of latest playable times may be chosen from each pair of video playable time and audio playable time corresponding to the following services received after the switching request time.

Figure 12:
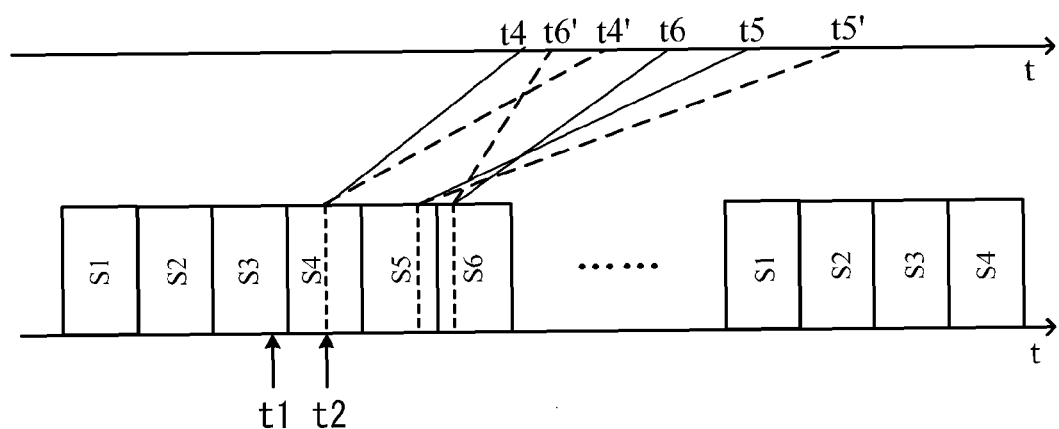
FIG. 12 is a schematic drawing of a set of video playable times and audio playable times of several services according to the present invention.

FIG. 12 illustrates a set of video playable times and a set of audio playable times. For example, t4 is the video playable time for S4, t4' is the related audio playable time for S4; t5 is the video playable time for S5, t5' is the related audio playable time for S5; and similarly t6 is the video playable time for S6 and t6' is the related audio playable time for S6.

From FIG. 12, the latest playable time from each pair (pair 1 (t4, t4'), pair 2 (t5, t5'), pair 3 (t6, t6')) can be selected. For example, the latest playable time are t4' in pair 1 for service S4, and t5' in pair 2 for service S5, and t6 in pair 3 for service S6. So a set of latest playable time is obtained, they are (t4', t5', t6). Finally, an earliest playable time can be chosen from this set of latest playable time, according to FIG. 12, the earliest playable time is t4' among (t4', t5' and t6), and thus the corresponding service S4 is the earliest playable service accordingly. So service S4 is chosen as the switching target service (channel) since it is the earliest playable service among the following services in consideration of seamlessly merging with next time slice of the same service and the synchronization of video and related audio packets.

As above mentioned, the step of calculating will be terminated when any one of the calculated latest playable time in each pair arrives.

It is to be understood for the skilled person in the art that the formulas to calculate the audio and video playable time are not limited to the formulas described previously.

Figure 6:
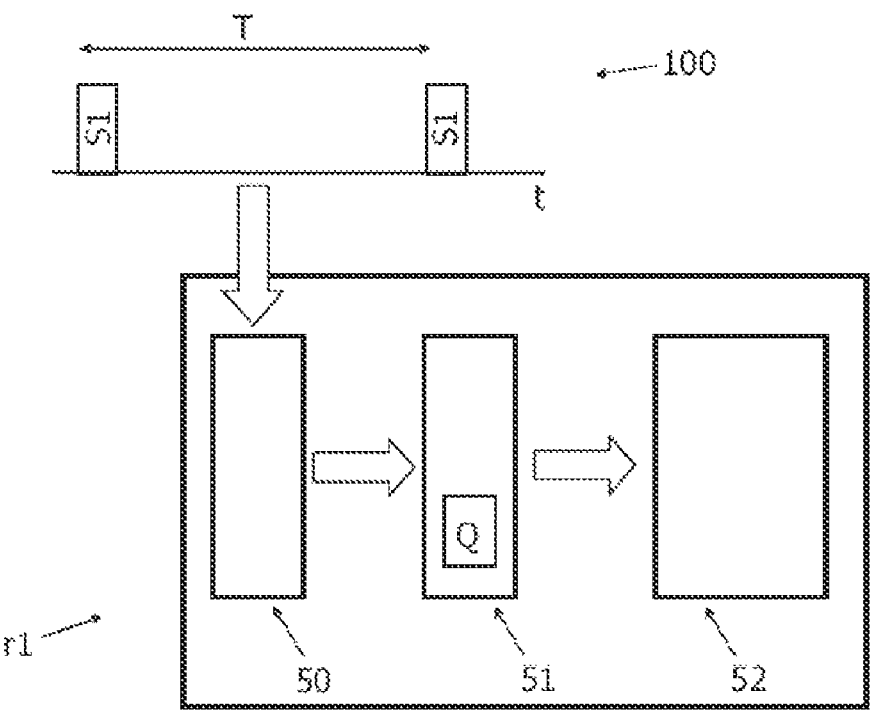
FIG. 6 is a schematic illustration of a receiving unit according to the present invention.

FIG. 6 is a schematic illustration of a receiving unit r1 according to the present invention, the receiving unit being adapted for receiving a plurality N of services in a time slicing mode with services being arranged in a certain time slice sequence. The unit r1 comprises receiving means 50 for receiving a service S1 embedded in the wireless signal 100, and processing means 51 for processing (e.g. decoding) the signal portion representing S1 by processing means 51. Finally, the signal portion S1 is made accessible for rendering by access means 52 in the receiving unit r1. The access means 52 can comprise a display and/or loudspeakers (neither is shown in the Figure). The receiving unit r1 according to the invention is arranged for changing from receiving a first service S1 to receiving a second service, the second service being chosen as the earliest playable service of the following services in time within the time slice sequence, so as to minimize the time between service changes.

The above mentioned earliest playable services can be the currently next service, e.g. S4 as in FIG. 4 or S4' as in FIG. 5, in time within the first time slice sequence, or a second time slice sequence.

Alternatively, the earliest playable service can be determined by the playable time of video packets. The receiving unit (r1) then further comprises a first calculator (e.g. a microprocessor executing instructions stored in a memory, not shown on the drawings, said instructions reflecting the technical steps of the method described above according to the second embodiment of determining the earliest playable service in the present invention) for calculating a set of video playable times of each following service according to video packets contained in said following services, said each following service being arranged to play at said video playable time for playing seamlessly, and a first determining means for determining said earliest playable service according to said set of video playable times.

Alternatively, the earliest playable service can be determined by the playable time of video and audio packet. The receiving unit (r1) then further comprises a second calculator (e.g. a micro-processor executing instructions stored in a memory, not shown on the drawings, said instructions reflecting the technical steps of the method described above according to the third embodiment of determining the earliest playable service in the present invention) for calculating a set of video playable times of each following service according to each video packets contained in said following services, and calculating a set of audio playable times of each following services according to each audio packets contained in said following services, said each audio packets to be played synchronously with said each video packets, said each following service being arranged to play at said video or audio playable time for playing seamlessly; and a selection means for selecting a set of latest playable times from each pair of said video playable time and said audio playable time corresponding to video packets and its related synchronous audio packets, and then determining said earliest playable service according to said set of latest playable time.

The processing means 51 further comprise a service change memory Q with a function to be explained in more detail below according to FIG. 7.

The receiving unit r1 as shown in FIG. 6 is only one embodiment of the invention, and the invention can in general be implemented in any suitable form including hardware, software, firmware or any combination of these. The invention or some features of the invention can be implemented as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

Figure 7:
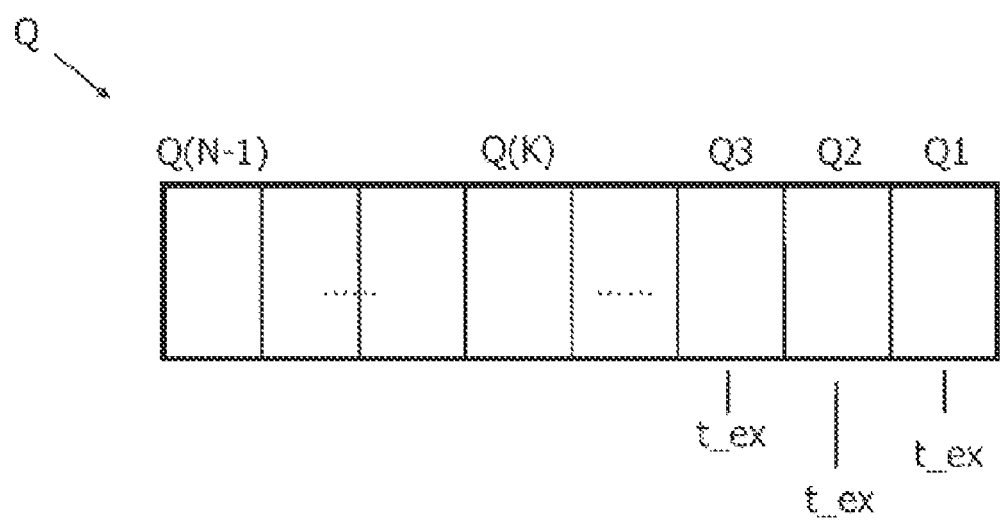
FIG. 7 shows a schematic drawing of a service change memory of the present invention.

FIG. 7 shows a schematic drawing of a service change memory Q (also shown in FIG. 6) of the present invention. This memory is advantageously introduced into the invention in order to avoid double accessing a service within a short time frame causing irritation for a user that wants to browse or zap across a range of services.

In a first embodiment, the service change memory Q stores which services have been received previously in a service change cycle through the available plurality N of services. Thus, the memory Q has N−1 entries and the memory keeps track of services that have already been accessed.

In a second embodiment, each service stored in the service change memory Q is allotted an expiration time $t\_ex$ and upon expiration of said expiration time $t\_ex$ the corresponding service is discarded from the service change memory Q. The service may be deleted from the memory Q or just flagged out as being expired. The expiration time $t\_ex$ is for example a preset time counting down to expiration. This time $t\_ex$ can be for example 1, 2 or 3 minutes. The expiration time $t\_ex$ can be preset during manufacturing or set by the user. Possibly, the expiration time $t\_ex$ can be set by the receiving unit r1 based on user zapping history, i.e. monitoring of user behavior (average frequency of zapping, average duration of accessing a service etc.) can be actively used to set the expiration time $t\_ex$. In a variation of this embodiment, the last time a service was accessed can be stored instead of allotting an expiration time $t\_ex$. Thus, services that have been accessed a certain time ago can be flagged out.

In a third embodiment of the memory Q, only the latest received K services in the service change memory (Q) are considered to be received in the service change memory (Q), where K is a number smaller than the plurality of services N. Thus, with e.g. N=10 services, only the last K=3 services are flagged as viewed. The number K can be for example 2, 3, 4 up to N−1. The number K can be preset from manufacturing or set by the user. Possibly, the number K can be set by the receiving unit r1 based on user zapping history i.e. monitoring of user behavior (average frequency of zapping, average duration of accessing a service etc.) can be actively used to set the number K.

Possibly, all of the above-mentioned three embodiments of the memory Q are combined into a single embodiment for operating the memory Q. The benefit of this combined embodiment is that the so-called "second round browsing" can be avoided. It is clear that if the user changes services quickly according to this embodiment, the user would always get to a service other than the latest K services he browsed. The main parameters for optimizing the memory Q are then K and the expiration time $t\_ex$:

If K is too small, then the user may reach a service he just browsed, which must be avoided; if K is too large, then in the later stage, the history is too long so that the zapping delay would increase.

For the expiration time $t\_ex$, if $t\_ex$ is too small, then the user would also reach a service he recently watched, and if $t\_ex$ is too large, the memory Q would often be in an almost-full status, which leads to large zapping delay.

In a possible case, where is K equal to N−1, then if the user quickly changes services, he would get a set of all services in the "first round", and he would get the "second round" as an exact copy of the "first round". Otherwise, if K is less than N−1, then the first N services the user has accessed may not include all the services, but still it is very likely a user would have accessed all services in a quite short period of time. It is contemplated that the optimum setting of K is equal to approximately N/2. Similarly, an optimum expiration time $t\_ex$ may be approximately 3 minutes. These parameters can be optimized using user testing.

The service change memory Q can also keep track of services from more than one transport stream if, in one service change cycle, the user changes between services from different transport streams. Furthermore, the service change memory Q can possibly prompt a change in transport stream if the zapping speed is too low and/or if the number of not yet accessed services in a service change cycle is too low e.g. the number N−K is below a preset value.

Figure 8:
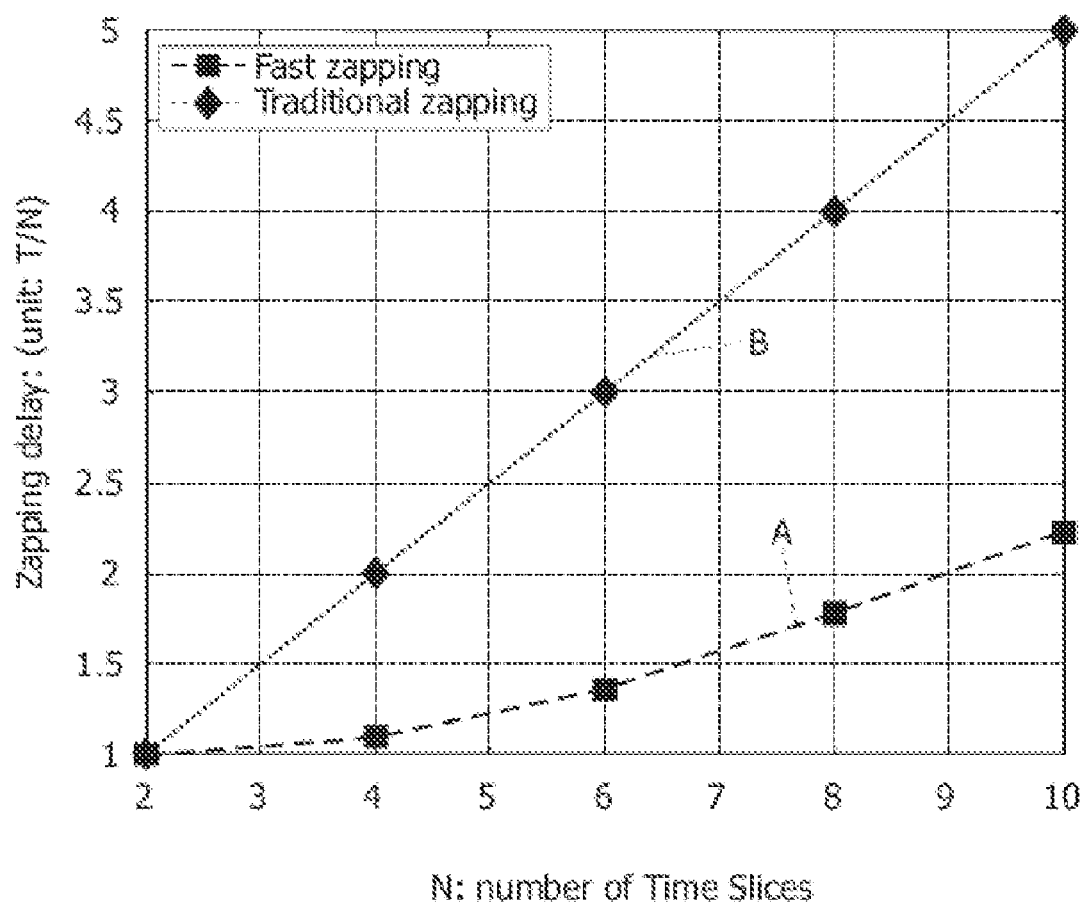
FIG. 8 is a graph showing a comparison of the zapping delay for traditional zapping and for zapping according to the present invention

FIG. 8 is a graph showing a theoretical comparison of the zapping delay with traditional zapping (curve B) and zapping according to the present invention (curve A). On the horizontal scale, the number of time slices N is given. On the vertical scale, the zapping delay is given in units of one time slice duration. As seen in FIG. 8, the advantage of the present invention is more pronounced at a high number of time slices, N. The model is based on the assumptions and conditions that:

1. all the zap events are randomly distributed,
2. all the bursts have at least one Intra-picture (I-frame), which is located in the head of the burst, and
3. only one browsing cycle is calculated, i.e. the average zapping delay is calculated in browsing all the services in one browsing cycle without repetitions.

The traditional zapping delay is half of the burst cycle period on average and the fast zapping delay is calculated with conditional probabilities due to the fact that no repetitions are assumed.

In summary, the present invention relates to a method of changing between a plurality N of distinct services, e.g. television channels, receivable on a receiving unit, such as a mobile phone/cellular phone, a personal digital assistant (PDA), a handheld television unit, or similar devices. The receiving unit is adapted to receive the plurality of services in a time slicing mode with services being arranged in a certain time slice sequence. The receiving unit is capable of receiving a first service (S1). When "zapping" from the first service to a second service, the second service (S4) being chosen is the currently next service in time within the time slice sequence so as to minimize the time (t2) between service changes. Thereby, a fast method of changing between services is provided in a simplified manner, the speed of change reaching the theoretical maximum when using time slicing.

Although the present invention has been described in connection with the specified embodiments, it is not intended to be limited to the specific form set forth herein. Rather, the scope of the present invention is limited only by the accompanying claims. In the claims, the term "comprising" does not exclude the presence of other elements or steps. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality. Furthermore, reference signs in the claims shall not be construed as limiting the scope.

The invention claimed is:

1. A method of changing between a plurality N of distinct services receivable on a receiving unit (r1) adapted to receive said plurality of services in a time slicing mode with services being arranged in a first time slice sequence, the method comprising the steps of:
   receiving by the receiving unit (r1) a first service (S1), and changing from receiving a first service to receiving a second service,
   wherein said second service is chosen as the earliest playable service of the following services in time within the first time slice sequence, or a second time slice sequence, so as to minimize the time (t2) between service changes.

2. A method according to claim 1, wherein said earliest playable service is the currently next service (S4, S4') in time within the first time slice sequence, or a second time slice sequence.

3. A method according to claim 1, said method further comprising the steps of:
   calculating a set of video playable times of each following service according to video packets contained in said following services, said each following service being arranged to play at said video playable time for playing seamlessly;
   determining said earliest playable service according to said set of video playable times.

4. A method according to claim 1, said method further comprising the steps of:
   calculating a set of video playable times of each following service according to each video packets contained in said following services, and calculating a set of audio playable times of each following services according to each audio packets contained in said following services, said each audio packets to be played synchronously with said each video packets, said each following service being arranged to play at said video or audio playable time for playing seamlessly,
   selecting a set of latest playable times from each pair of said video playable time and said audio playable time corresponding to video packets and its related synchronous audio packets, and selecting an earliest playable time from said set of latest playable times,
   determining said earliest playable service according to said earliest playable time.

5. A method according to claim 1, wherein the receiving unit can receive more than one service during one time slice period (T).

6. A method according to claim 1, wherein the receiving unit (r1) is storing information in a service change memory (Q) regarding services that have been received previously in a service change cycle.

7. A method according to claim 6, wherein the second service is chosen as the one of following services in time within the first or the second time slice sequence that has not previously been received in the service change cycle stored in the service change memory (Q).

8. A method according to claim 6, wherein each service stored in the service change memory (Q) is allotted an expiration time (t_ex), and upon expiration of said expiration time (t_ex) the corresponding service is discarded from the service change memory (Q).

9. A method according to claim 6, wherein only the latest received K services in the service change memory (Q) are considered received in the service change memory (Q), K being smaller than N.

10. A method according to claim 1, wherein the second service is chosen as one of the following services in time within the first or the second time slice sequence that has a random access signal portion, said random access signal portion being decodable without a previous and/or a subsequent signal portion of the second service.

11. A method according to claim 1, wherein the changing from a first service (S1) to a second service can be performed automatically in a pre-determined manner.

12. A method according to claim 11, wherein the automatic change is synchronized with the time slicing sequence of services.

13. A method according to claim 1, wherein the receiving unit (r1) is adapted for receiving and storing an additional third service simultaneously with receiving said first service in a time slice mode.

14. A method according to claim 13, wherein the third service is chosen from a list of user preferred services.

15. A method according to claim 14, wherein the list is actively selected by the user.

16. A method according to claim 14, wherein the list is generated based on previous user history.

17. A computer program product comprising program code, stored in a non-transitory computer readable medium, and being adapted to enable a computer system comprising at least one computer having data storage means associated therewith to control a receiving unit according to claim 1.

18. A receiving unit (r1) being adapted for receiving a plurality N of services in a time slicing mode with services being arranged in a first time slice sequence, the unit comprising:
- receiving means (50, 51) for receiving a service, and
- access means (52) for making the received service accessible to a user, wherein the receiving unit is arranged for changing from receiving a first service (S1) to receiving a second service, said second service being chosen as the earliest playable service of following services in time within the first time slice sequence, or a second time slice sequence, so as to minimize the time (t2) between service changes.

19. A receiving unit (r1) as claimed in claim 18, wherein said earliest playable services is the currently next service (S4, S4') in time within the first time slice sequence, or a second time slice sequence.

20. A receiving unit (r1) as claimed in claim 18, said unit further comprising:
- a first calculator for calculating a set of video playable times of each following service according to video packets contained in said following services, said each following service being arranged to play at said video playable time for playing seamlessly,
- a first determining means for determining said earliest playable service according to said set of video playable times.

21. A receiving unit (r1) as claimed in claim 18, said unit further comprising:
- a second calculator for calculating a set of video playable times of each following service according to each video packets contained in said following services, and calculating a set of audio playable times of each following services according to each audio packets contained in said following services, said each audio packets to be played synchronously with said each video packets, said each following service being arranged to play at said video or audio playable time for playing seamlessly,
- a selection means for selecting a set of latest playable times from each pair of said video playable time and said audio playable time corresponding to video packets and its related synchronous audio packets, and then determining said earliest playable service according to said set of latest playable time.

* * * * *